United States Patent
Levitsky et al.

(10) Patent No.: US 11,924,014 B2
(45) Date of Patent: Mar. 5, 2024

(54) DYNAMIC MODULATION AND CODING SCHEME TABLE SWITCHING TO INDICATE TRANSMIT WAVEFORM SWITCHING

(71) Applicant: QUALCOMM Incorporated, San Diego, CA (US)

(72) Inventors: Michael Levitsky, Rehovot (IL); Ran Berliner, Kfar-Aviv (IL); Gokul Sridharan, Sunnyvale, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/449,978

(22) Filed: Oct. 5, 2021

(65) Prior Publication Data

US 2022/0123983 A1   Apr. 21, 2022

Related U.S. Application Data

(60) Provisional application No. 63/198,398, filed on Oct. 15, 2020.

(51) Int. Cl.
*H04L 27/26* (2006.01)
*H04W 74/00* (2009.01)
*H04L 1/00* (2006.01)

(52) U.S. Cl.
CPC ...... *H04L 27/2636* (2013.01); *H04L 27/2678* (2013.01); *H04W 74/004* (2013.01);
(Continued)

(58) Field of Classification Search
None
See application file for complete search history.

(56) References Cited

U.S. PATENT DOCUMENTS 10,523,358 B1 * 12/2019 Park ............... H04B 7/0686
11,477,765 B2 * 10/2022 Hwang ............. H04L 1/0003
(Continued)

FOREIGN PATENT DOCUMENTS

EP        3833145 A1   6/2021
WO   WO-2018229736 A1  12/2018

OTHER PUBLICATIONS

AT&T: "Waveform Selection Mechanisms for DFTsOFDM", 3GPP Draft, R1-1718400, 3GPP TSG RAN WG1 #90bis, Waveform Selection Mechanisms for DFTsOFDM, 3rd Generation Partnership Project (3GPP), Mobile Competence Centre, 650, Route Des Lucioles, F-06921 Sophia-Antipolis Cedex, France, vol. Ran WG1, No. Prague, Czech Republic, Aug. 21, 2017-Aug. 25, 2017, Oct. 8, 2017 (Oct. 8, 2017), XP051341582, pp. 1-4, Retrieved from the Internet: URL:http://www.3gpp.org/ftp/Meetings_3GPP_SYNC/RAN1/Docs/ [retrieved on Oct. 8, 2017] Sections 1-2, p. 1-p. 4 tables 1-2.
(Continued)

*Primary Examiner* — Bob A Phunkulh
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a dynamic indication to switch from a modulation and coding scheme (MCS) table to a new MCS table. The UE may transmit, to the base station, one or more uplink communications that use a transmit waveform type associated with the new MCS table. Numerous other aspects are provided.

30 Claims, 7 Drawing Sheets

(52) U.S. Cl.
CPC ......... *H04W 74/006* (2013.01); *H04L 1/0003* (2013.01); *H04L 1/0009* (2013.01); *H04L 1/0026* (2013.01)

(56) References Cited

U.S. PATENT DOCUMENTS

| | | | |
|---|---|---|---|
| 2011/0235604 A1 | 9/2011 | Inoue et al. | |
| 2014/0087744 A1* | 3/2014 | Yang | H04W 76/23 455/450 |
| 2018/0368108 A1 | 12/2018 | Zeng et al. | |
| 2019/0190644 A1* | 6/2019 | Ugurlu | H04L 1/0016 |
| 2019/0238257 A1* | 8/2019 | Hosseini | H04L 1/0031 |
| 2019/0253121 A1 | 8/2019 | Islam et al. | |
| 2020/0053820 A1* | 2/2020 | Chin | H04W 76/27 |
| 2020/0204289 A1 | 6/2020 | Yoshimoto et al. | |
| 2020/0213033 A1 | 7/2020 | Chen | |
| 2020/0374911 A1* | 11/2020 | Lee | H04W 72/1289 |
| 2020/0412431 A1* | 12/2020 | Park | H04W 24/10 |
| 2020/0413425 A1* | 12/2020 | Lin | H04L 5/0055 |
| 2021/0050901 A1* | 2/2021 | Chin | H04B 7/063 |
| 2021/0105164 A1* | 4/2021 | Nakamura | H04L 27/2607 |
| 2021/0126758 A1 | 4/2021 | Rico Alvarino et al. | |
| 2021/0266953 A1* | 8/2021 | Pelletier | H04L 5/0044 |
| 2021/0320747 A1* | 10/2021 | Yoshioka | H04L 1/0021 |
| 2022/0116152 A1* | 4/2022 | Iyer | H04L 1/188 |
| 2022/0174635 A1* | 6/2022 | Ryu | H04W 56/0045 |

OTHER PUBLICATIONS

International Search Report and Written Opinion—PCT/US2021/071744—ISA/EPO—dated Jan. 5, 2022.
Qualcomm Incorporated: "Potential Coverage Enhancement Techniques for PUSCH", 3GPP Draft, R1-2008626, 3GPP TSG-RAN WG1 Meeting #103e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020 (Oct. 17, 2020), XP051940252, 14 Pages, Retrieved from the Internet: URL:https://ftp.3gpp.org/tsg_ran/WG1_RL1/TSGR1_103-e/Docs/R1-2008626.zip R1-2008626 Potential coverage enhancement techniques for PUSCH.docx [retrieved on Oct. 17, 2020] Section 4, p. 9-p. 11 figures 12-13.

* cited by examiner

DYNAMIC MODULATION AND CODING SCHEME TABLE SWITCHING TO INDICATE TRANSMIT WAVEFORM SWITCHING

CROSS-REFERENCE TO RELATED APPLICATION

This Patent Application claims priority to U.S. Provisional Patent Application No. 63/198,398, filed on Oct. 15, 2020, entitled "DYNAMIC MODULATION AND CODING SCHEME TABLE SWITCHING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamic modulation and coding scheme (MCS) table switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, a dynamic indication to switch from a modulation and coding scheme (MCS) table to a new MCS table; and transmitting, to the base station, one or more uplink communications that use a transmit waveform type associated with the new MCS table.

In some aspects, a method of wireless communication performed by a base station includes transmitting, to a UE, a dynamic indication to switch from an MCS table to a new MCS table; and receiving, from the UE, one or more uplink communications that use a transmit waveform type associated with the new MCS table.

In some aspects, a UE for wireless communication includes a memory and one or more processors coupled to the memory, the one or more processors configured to: receive, from a base station, a dynamic indication to switch from an MCS table to a new MCS table; and transmit, to the base station, one or more uplink communications that use a transmit waveform type associated with the new MCS table.

In some aspects, a base station for wireless communication includes a memory and one or more processors coupled to the memory, the one or more processors configured to: transmit, to a UE, a dynamic indication to switch from an MCS table to a new MCS table; and receive, from the UE, one or more uplink communications that use a transmit waveform type associated with the new MCS table.

In some aspects, a non-transitory computer-readable medium storing a set of instructions for wireless communication includes one or more instructions that, when executed by one or more processors of a UE, cause the UE to: receive, from a base station, a dynamic indication to switch from an MCS table to a new MCS table; and transmit, to the base station, one or more uplink communications that use a transmit waveform type associated with the new MCS table.

In some aspects, a non-transitory computer-readable medium storing a set of instructions for wireless communication includes one or more instructions that, when executed by one or more processors of a base station, cause the base station to: transmit, to a UE, a dynamic indication to switch from an MCS table to a new MCS table; and receive, from the UE, one or more uplink communications that use a transmit waveform type associated with the new MCS table.

In some aspects, an apparatus for wireless communication includes means for receiving, from a base station, a dynamic indication to switch from an MCS table to a new MCS table; and means for transmitting, to the base station, one or more uplink communications that use a transmit waveform type associated with the new MCS table.

In some aspects, an apparatus for wireless communication includes means for transmitting, to a UE, a dynamic indication to switch from an MCS table to a new MCS table; and means for receiving, from the UE, one or more uplink communications that use a transmit waveform type associated with the new MCS table.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
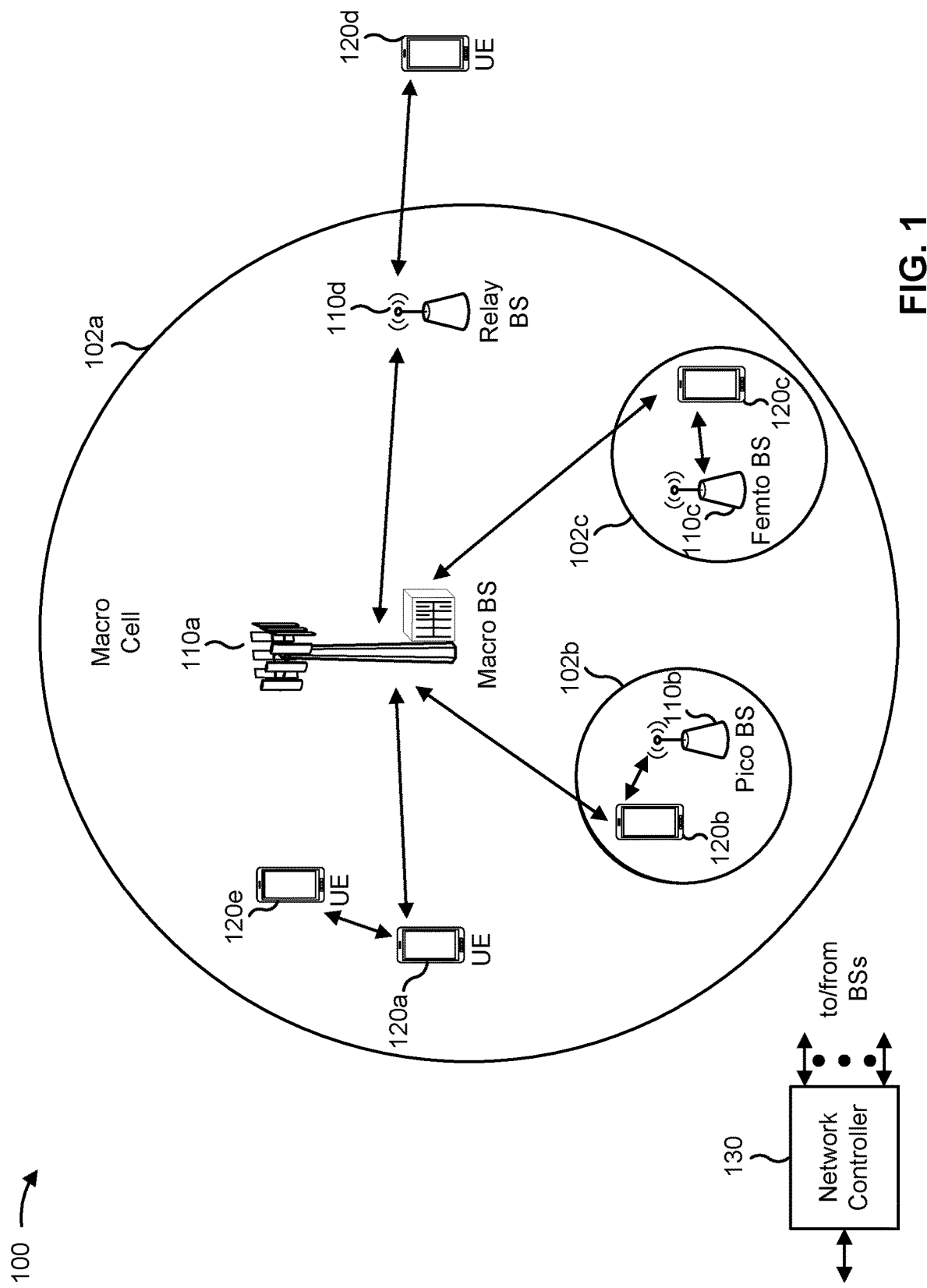
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
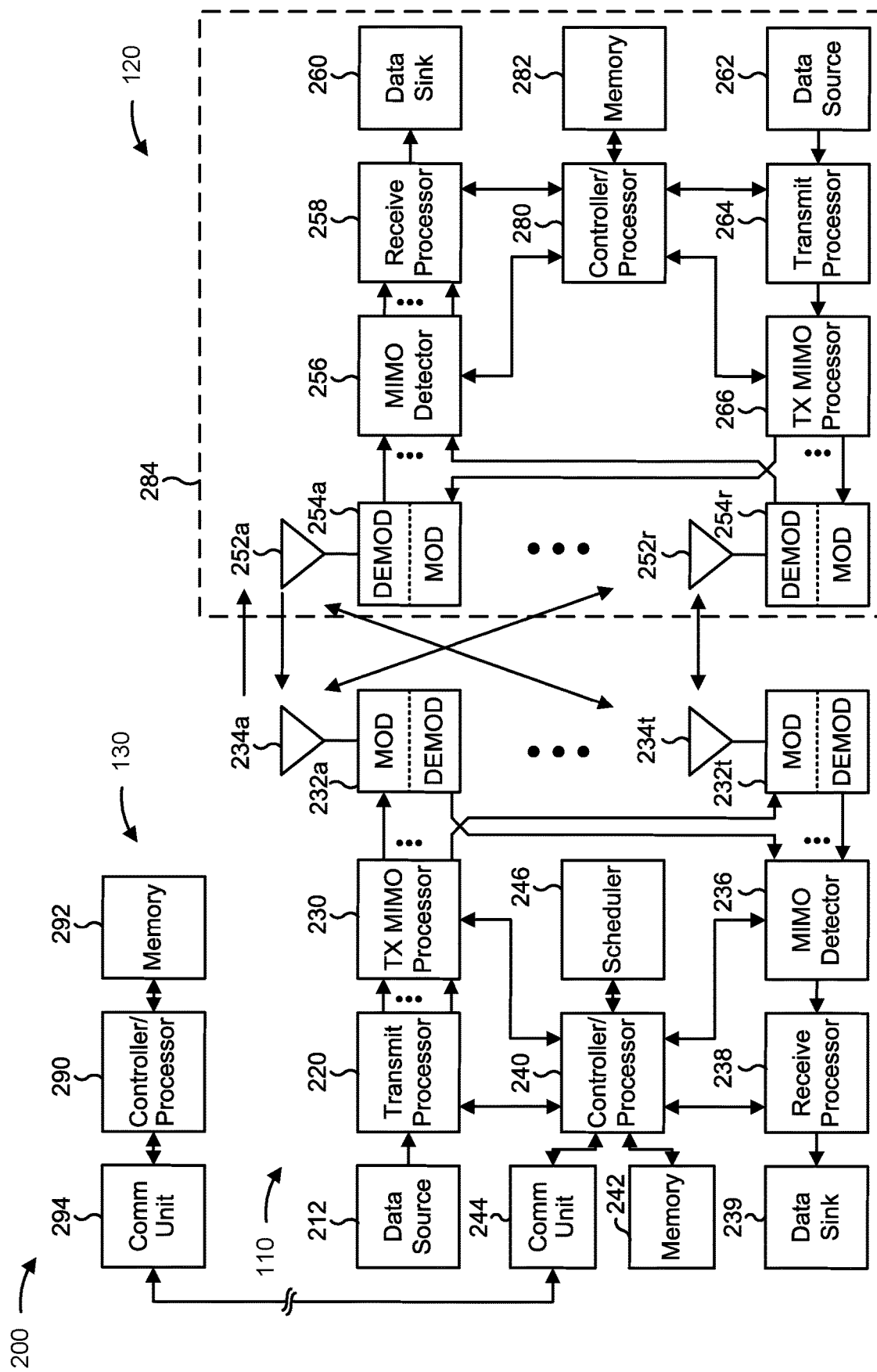
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-5).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-5).

Controller/processor 240 of base station 110, controller/processor 280 of UE 120, and/or any other component(s) of FIG. 2 may perform one or more techniques associated with dynamic MCS table switching, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, the UE includes means for receiving, from a base station, a dynamic indication to switch from an MCS table to a new MCS table; and/or means for transmitting, to the base station, one or more uplink communications that use a transmit waveform type associated with the new MCS table. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE includes means for determining a transform precoder activation state based at least in part on the new MCS table.

In some aspects, the UE includes means for determining the transmit waveform type for transmitting the one or more uplink communications based at least in part on the new MCS table.

In some aspects, the UE includes means for determining whether a transform precoder is enabled based at least in part on the new MCS table; and/or means for determining the transmit waveform type based at least in part on whether the transform precoder is enabled.

In some aspects, the UE includes means for receiving a configuration that indicates the MCS table, the new MCS table, and an initial transform precoder activation state.

In some aspects, the UE includes means for transmitting information that indicates that the UE is capable of transmit waveform switching by dynamic indication.

In some aspects, the base station includes means for transmitting, to a UE, a dynamic indication to switch from an MCS table to a new MCS table; and/or means for receiving, from the UE, one or more uplink communications that use a transmit waveform type associated with the new MCS table. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for determining a transform precoder activation state for the UE.

In some aspects, the base station includes means for determining the transmit waveform type for the one or more uplink communications.

In some aspects, the base station includes means for determining whether a transform precoder is to be enabled; and/or means for determining the transmit waveform type based at least in part on whether the transform precoder is enabled.

In some aspects, the base station includes means for transmitting a configuration that indicates the MCS table, the new MCS table, and an initial transform precoder activation state.

In some aspects, the base station includes means for receiving information that indicates that the UE is capable of transmit waveform switching by dynamic indication.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In 5G, different types of waveforms may be used for uplink and/or downlink communications. For example, downlink communications may use a CP-OFDM waveform (e.g., an OFDM waveform that uses a CP) and uplink communications may use the CP-OFDM waveform or a DFT-s-OFDM waveform (e.g., a single-carrier waveform).

The CP-OFDM waveform may provide a relatively high signal-to-noise ratio (SNR) and/or a relatively high spectral efficiency as compared to the DFT-s-OFDM waveform. For example, the CP-OFDM waveform may be associated with MCS tables that include more spectrally-efficient MCSs relative to the DFT-s-OFDM waveform, and therefore provides more spectrally-efficient operation relative to the DFT-s-OFDM waveform and/or enables multiple layers transmissions. Accordingly, the CP-OFDM waveform may be used as a default waveform for the majority of UEs in a cell's coverage.

The DFT-s-OFDM waveform may provide a relatively low peak to average power ratio (PAPR) relative to the CP-OFDM waveform, thereby allowing for increased transmit power and better coverage. Moreover, the DFT-s-OFDM waveform may be used with MCSs that are not available for the CP-OFDM waveform, such as MCSs that use relatively lower code rates and/or pi/2 binary phase shift keying (BPSK) modulation. The DFT-s-OFDM waveform may also provide relatively low complexity relative to the CP-OFDM waveform. For example, the DFT-s-OFDM waveform may use a single transmission layer. The DFT-s-OFDM waveform may not be suitable for a cell region associated with high SNR or high spectral efficiency. Accordingly, the DFT-s-OFDM waveform may be used by UEs at a cell's edge, UEs experiencing a poor link budget, and/or low capability UEs.

As described above, a UE may use a transmit waveform according to a location of the UE within a cell's coverage. If the UE is mobile, the UE may have different locations within the cell's coverage at different times. Thus, a transmission scheme used by the UE can be based on reception conditions experienced by the UE (e.g., at a low-SNR edge of a cell, a mid-SNR range of the cell, or a high-SNR range of the cell). Whether a UE is to use a DFT-s-OFDM or a CP-OFDM transmission scheme is radio resource control (RRC) configured for the UE. For example, a transform precoder parameter may be configured for the UE, and the UE may use DFT-s-OFDM if transform precoding is enabled or CP-OFDM is transform precoding is disabled. The transform precoder parameter may be in a physical uplink shared channel (PUSCH) configuration (e.g., transformPrecoder in pusch-Config) for a PUSCH scheduled by a scheduling grant (e.g., carried by DCI format 0_1) or in a configured grant configuration (e.g., transformPrecoder in configuredGrant-Config) for a PUSCH according to a configured grant. In some cases, a message 3 (msg3) transform precoder RRC parameter (e.g., msg3-transformPrecoder) for a four-step random access channel (RACH) procedure, or a message A (msgA) transform precoder RRC parameter (e.g., msg3-transformPrecoder-msgA) for a two-step RACH procedure, may indicate the transform precoder activation state for a PUSCH scheduled by an uplink grant in a random access response, a PUSCH scheduled by DCI format 0_0, or another scheduled PUSCH or configured grant PUSCH if the transform precoder parameter is not configured in the PUSCH configuration or the configured grant configuration, respectively.

RRC reconfiguration of the transform precoder parameter(s) is nonsynchronous and may result in hundreds of milliseconds of latency. Accordingly, during this reconfiguration period, a base station may lack information on the transmission scheme used by a UE. Thus, using RRC reconfiguration to indicate switching between DFT-s-OFDM and CP-OFDM to a UE may result in link interruption. This may affect a performance of communications from the UE, particularly if the UE is approaching a cell's edge. Some systems may not allow use of a DFT-s-OFDM transmission scheme to avoid the aforementioned switching issues. In such cases, UEs at a cell's edge cannot use the DFT-s-OFDM waveform to increase transmit power, thereby resulting in failed uplink transmissions, limited PUSCH coverage, additional retransmissions, loss of a connection to the network, and/or increased consumption of network and UE resources (e.g., associated with the additional retransmission or reestablishing the connection), among other examples. Thus, a practical technique for dynamic switching between CP-OFDM and DFT-s-OFDM schemes may be useful.

Some techniques and apparatuses described herein provide dynamic indication of MCS table switching. In particular, a base station may transmit a dynamic indication (e.g., via a medium access control control element (MAC-CE)) to a UE to switch from an initial MCS table (e.g., that is indicated by an RRC configuration) to a new MCS table. The UE may determine a transform precoder activation state (e.g., enabled or disabled) and/or a transmit waveform type (e.g., DFT-s-OFDM or CP-OFDM) based at least in part on the new MCS table that is indicated. In this way, the base station may signal a switch to a new MCS table and/or, correspondingly, to a new transform precoder parameter state in a synchronous manner (e.g., such that both the base station and the UE are aligned as to a switching time relative to a transmission time of acknowledgment feedback for the dynamic indication), without link interruption, and with a very small latency relative to RRC configuration. Moreover, the base station may indicate (e.g., implicitly) to the UE to switch to a new transmit waveform and/or to use an MCS with a different spectral efficiency based at least in part on an indication to switch to a new MCS table. Accordingly, the UE may use a transmit waveform and/or spectral efficiency that is tailored to a real time location of the UE within a cell or a real time link budget condition for the UE. As a result, a performance of uplink transmissions of the UE may be improved.

Figure 3:
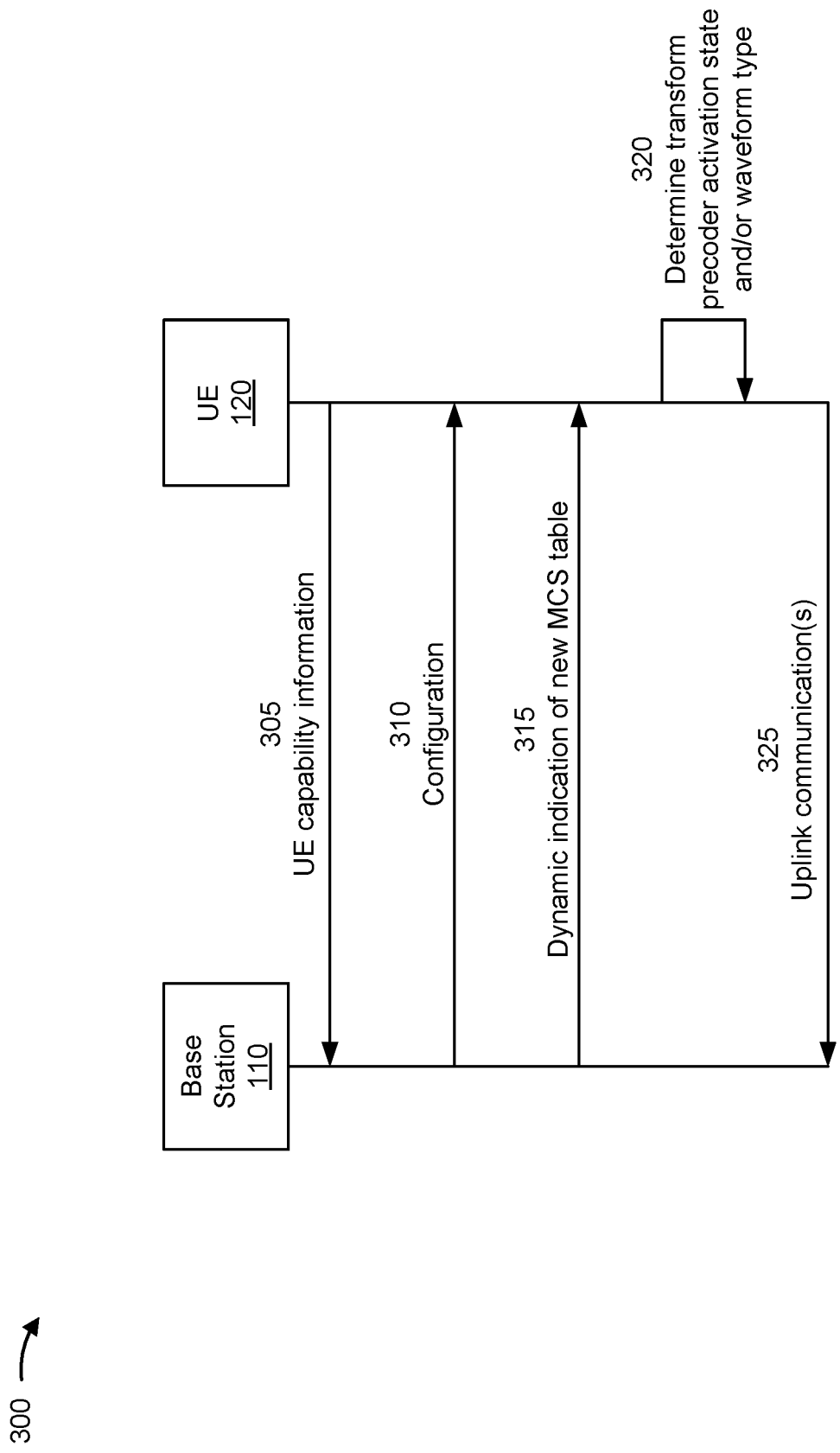
FIG. 3 is a diagram illustrating an example associated with dynamic modulation and coding scheme (MCS) table switching, in accordance with the present disclosure.

FIG. 3 is a diagram illustrating an example 300 associated with dynamic MCS table switching, in accordance with the present disclosure. As shown in FIG. 3, example 300 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink. In some aspects, the UE 120 may be mobile (e.g., capable of low mobility, moderate mobility, or high mobility), and may be present at different locations within a cell implemented by the base station 110 at different times.

As shown by reference number 305, the UE 120 may transmit, and the base station 110 may receive, UE capability information. For example, the UE 120 may transmit the UE capability information in a UE capability information message as part of an initial access procedure. The UE capability information may indicate whether the UE 120 is capable of MCS table switching by dynamic indication, such as whether the UE 120 is capable of transmit waveform switching by the dynamic indication. That is, the UE capability information may indicate whether the UE 120 is associated with a dynamic MCS table switching capability, such as a dynamic transmit waveform switching capability. In some aspects, a feature group indicator (FGI) may be defined for indicating dynamic MCS table switching capability, such as dynamic transmit waveform switching capability, in the UE capability information.

As shown by reference number 310, the base station 110 may transmit, and the UE 120 may receive, a configuration. The configuration may be a semi-static configuration, such as an RRC configuration (e.g., an RRC reconfiguration). For example, the configuration may be a PUSCH configuration and/or a configured grant configuration. The configuration may include a transform precoder parameter, as described above, that indicates an initial (e.g., default) transform precoder activation state (e.g., enabled or disabled) for the UE 120. In addition, the configuration may indicate a first MCS table for a first waveform-based (e.g., DFT-s-OFDM) transmission and a second MCS table for a second waveform-based (e.g., CP-OFDM) transmission. For example, the first MCS table may be for a PUSCH with transform precoding and 64 quadrature amplitude modulation (QAM), and the second MCS table may be for a physical downlink shared channel (PDSCH) (which can be used by the UE 120 for a PUSCH without transform precoding). In some aspects, the first MCS table may be associated with lower spectral efficiencies than the second MCS table (e.g., based on average spectral efficiencies of the first MCS table and the second MCS table). An MCS table may include a data structure that maps a plurality of sets of MCS parameters to respective index values (e.g., MCS indices). For example, each row of an MCS table, identified by an index value (e.g., an MCS index), may include a set of MCS parameters. A set of MCS parameters may include a modulation order, a target code rate, and/or a spectral efficiency, among other examples.

The UE 120 may determine to use an MCS table based at least in part on the initial transform precoder activation state.

The UE 120 may determine to use the first MCS table for DFT-s-OFDM if the transform precoder is enabled, and the UE 120 may determine to use the second MCS table for CP-OFDM if the transform precoder is disabled. As described above, separate transform precoder parameters may be configured for scheduled PUSCH transmissions, configured grants for PUSCH transmissions, and random access grants for PUSCH transmissions.

In some aspects, the UE 120 may transmit one or more communications based at least in part on the indicated MCS table (e.g., indicated by the transform precoder parameter). For example, the UE 120 may transmit one or more communications using an MCS of the indicated MCS table. The UE 120 may address (e.g., use) the indicated MCS table for each allocation for the UE 120 (e.g., each allocation of the same type).

As shown by reference number 315, the base station 110 may transmit, and the UE 120 may receive, a dynamic indication. In some aspects, the base station 110 may transmit the dynamic indication based at least in part on a determination that the UE 120 indicated a dynamic MCS table switching capability, such as a dynamic transmit waveform switching capability (e.g., in the UE capability information). The dynamic indication may be associated with a message type that is transmitted by the base station 110 more frequently than a message type associated with the configuration (e.g., an RRC message). For example, the dynamic indication may be transmitted in a MAC-CE or downlink control information (DCI).

The dynamic indication may indicate that the UE 120 is to switch from an initial MCS table (e.g., indicated by the configuration) to a new MCS table identified by the dynamic indication. The initial MCS table may be associated with one of CP-OFDM and DFT-s-OFDM, and the new MCS table may be associated with the other of CP-OFDM and DFT-s-OFDM. In some aspects, the initial MCS table may be indicated by the configuration, as described above, or may be indicated by a previous dynamic indication. In some aspects, the dynamic indication may identify the new MCS table by an identifier. For example, each MCS table provisioned for the UE 120 may be assigned a unique numerical identifier, and the dynamic indication may identify a particular numerical identifier.

In some aspects, the base station 110 may transmit the dynamic indication based at least in part on a location of the UE 120, a link quality with the UE 120, and/or a channel capacity, among other examples. For example, the base station 110 may transmit the dynamic indication based at least in part on determining that a distance of the UE 120 from a cell's edge satisfies a threshold value, based at least in part on determining that a channel quality metric associated with the UE 120 satisfies a threshold value, and/or based at least in part on determining that a channel usage satisfies a threshold value. In other words, the base station 110 may transmit the dynamic indication based at least in part on determining a transform precoder activation state and/or a transmit waveform type that the UE 120 is to use.

As shown by reference number 320, the UE 120 may determine a transform precoder activation state (e.g., enabled or disabled) and/or a transmit waveform type (e.g., DFT-s-OFDM or CP-OFDM) based at least in part on the new MCS table (e.g., the new MCS table that is indicated may implicitly indicate the transform precoder activation state and/or the transmit waveform type). For example, the new MCS table may be a first MCS table for an enabled transform precoder/DFT-s-OFDM or a second MCS table for a disabled transform precoder/CP-OFDM. Thus, the UE 120 may determine whether transform precoding is enabled based at least in part on the new MCS table that is indicated, and the UE 120 may determine the transmit waveform type based at least in part on whether transform precoding is enabled. For example, the UE 120 may determine that the transmit waveform type is DFT-s-OFDM based at least in part on determining that the new MCS table is associated with an enabled transform precoder, and the UE 120 may determine that the transmit waveform type is CP-OFDM based at least in part on determining that the new MCS table is associated with a disabled transform precoder. The base station 110 may also determine the transform precoder activation state and the transmit waveform type to be used by the UE 120, as described above.

As shown by reference number 325, the UE 120 may transmit, and the base station 110 may receive, one or more uplink communications based at least in part on the new MCS table that is indicated. For example, the UE 120 may transmit the uplink communication(s) using the determined transmit waveform type (e.g., the DFT-s-OFDM waveform or the CP-OFDM waveform). In some aspects, an activation time (e.g., for the UE 120 and the base station 110) for the new MCS table and/or the transmit waveform type, following reception of the dynamic indication (e.g., a PDSCH carrying a MAC-CE that provides the dynamic indication) may based at least in part on a transmission time of acknowledgment feedback, transmitted by the UE 120, for the dynamic indication (e.g., for the PDSCH carrying the MAC-CE that provides the dynamic indication). For example, the activation time may be a quantity of slots (e.g., four slots) after an uplink slot in which the acknowledgment feedback is signaled.

In this way, dynamic MCS table switching may provide for synchronous switching between MCS tables, and associated switching between waveform types and/or spectral efficiencies, based at least in part on channel conditions and/or channel capacity. As a result, dynamic MCS table switching may provide improved performance for uplink transmissions, improved cell coverage, improved spectral efficiency, and/or improved link reliability, among other examples.

As indicated above, FIG. 3 is provided as an example. Other examples may differ from what is described with respect to FIG. 3.

Figure 4:
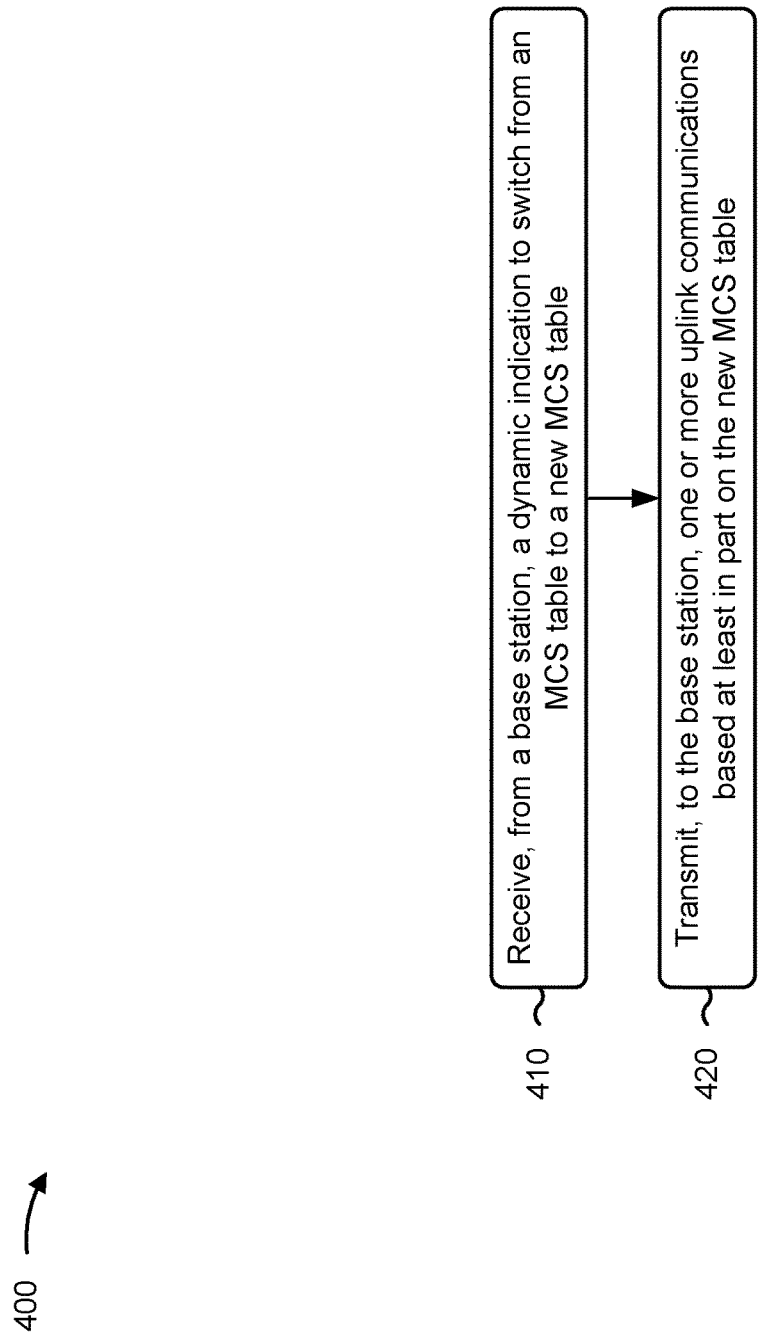
FIGS. 4-5 are diagrams illustrating example processes associated with dynamic MCS table switching, in accordance with the present disclosure.

FIG. 4 is a diagram illustrating an example process 400 performed, for example, by a UE, in accordance with the present disclosure. Example process 400 is an example where the UE (e.g., UE 120) performs operations associated with dynamic MCS table switching to indicate transmit waveform switching.

As shown in FIG. 4, in some aspects, process 400 may include receiving, from a base station, a dynamic indication to switch from an initial MCS table to a new MCS table (block 410). For example, the UE (e.g., using reception component 602, depicted in FIG. 6) may receive, from a base station, a dynamic indication to switch from an initial MCS table to a new MCS table, as described above.

As further shown in FIG. 4, in some aspects, process 400 may include transmitting, to the base station, one or more uplink communications based at least in part on the new MCS table (block 420). For example, the UE (e.g., using transmission component 604, depicted in FIG. 6) may transmit, to the base station, one or more uplink communications based at least in part on the new MCS table, as described above.

Process 400 may include additional aspects, such as any single aspect or any combination of aspects described below and/or in connection with one or more other processes described elsewhere herein.

In a first aspect, the dynamic indication is received in a MAC-CE.

In a second aspect, alone or in combination with the first aspect, process 400 includes determining a transform precoder activation state based at least in part on the new MCS table.

In a third aspect, alone or in combination with one or more of the first and second aspects, process 400 includes determining a transmit waveform type for transmitting the one or more uplink communications based at least in part on the new MCS table.

In a fourth aspect, alone or in combination with one or more of the first through third aspects, determining the transmit waveform type includes determining whether a transform precoder is enabled based at least in part on the new MCS table, and determining the transmit waveform type based at least in part on whether the transform precoder is enabled.

In a fifth aspect, alone or in combination with one or more of the first through fourth aspects, the transmit waveform type is a DFT-s-OFDM waveform or a CP-OFDM waveform.

In a sixth aspect, alone or in combination with one or more of the first through fifth aspects, the new MCS table is a first MCS table associated with a DFT-s-OFDM waveform or a second MCS table associated with a CP-OFDM waveform.

In a seventh aspect, alone or in combination with one or more of the first through sixth aspects, the new MCS table is a first MCS table associated with an enabled transform precoder or a second MCS table associated with a disabled transform precoder.

In an eighth aspect, alone or in combination with one or more of the first through seventh aspects, process 400 includes receiving a configuration that indicates the initial MCS table, the new MCS table, and an initial transform precoder activation state.

In a ninth aspect, alone or in combination with one or more of the first through eighth aspects, process 400 includes transmitting information that indicates that the UE is capable of MCS table switching, such as transmit waveform switching, by dynamic indication.

In a tenth aspect, alone or in combination with one or more of the first through ninth aspects, an activation time for at least one of the new MCS table or the transmit waveform type is based at least in part on a transmission time of acknowledgment feedback for the dynamic indication.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
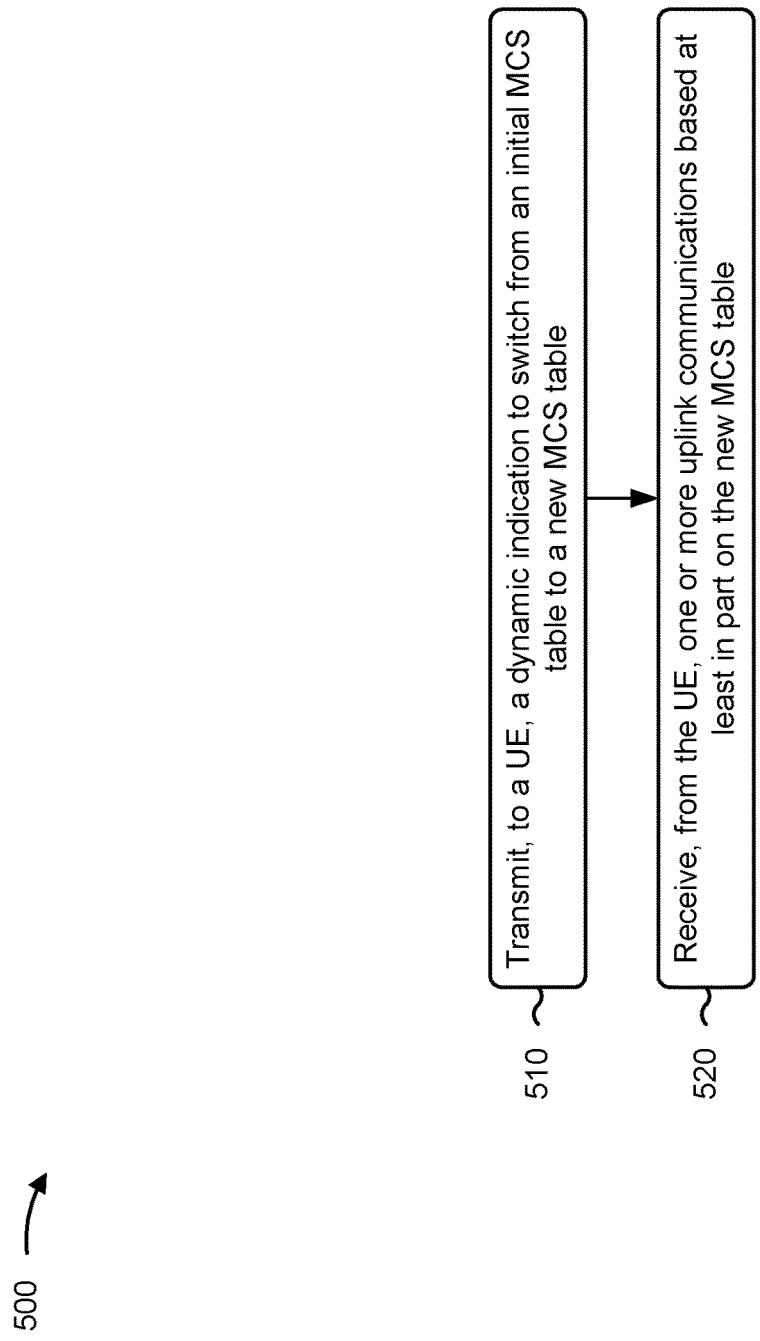

FIG. 5 is a diagram illustrating an example process 500 performed, for example, by a base station, in accordance with the present disclosure. Example process 500 is an example where the base station (e.g., base station 110) performs operations associated with dynamic MCS table switching to indicate transmit waveform switching.

As shown in FIG. 5, in some aspects, process 500 may include transmitting, to a UE, a dynamic indication to switch from an initial MCS table to a new MCS table (block 510). For example, the base station (e.g., using transmission component 704, depicted in FIG. 7) may transmit, to a UE, a dynamic indication to switch from an initial MCS table to a new MCS table, as described above.

As further shown in FIG. 5, in some aspects, process 500 may include receiving, from the UE, one or more uplink communications based at least in part on the new MCS table (block 520). For example, the base station (e.g., using reception component 702, depicted in FIG. 7) may receive, from the UE, one or more uplink communications based at least in part on the new MCS table, as described above.

Process 500 may include additional aspects, such as any single aspect or any combination of aspects described below and/or in connection with one or more other processes described elsewhere herein.

In a first aspect, the dynamic indication is transmitted in a MAC-CE.

In a second aspect, alone or in combination with the first aspect, process 500 includes determining a transform precoder activation state for the UE.

In a third aspect, alone or in combination with one or more of the first and second aspects, process 500 includes determining a transmit waveform type for the one or more uplink communications.

In a fourth aspect, alone or in combination with one or more of the first through third aspects, determining the transmit waveform type includes determining whether a transform precoder is to be enabled, and determining the transmit waveform type based at least in part on whether the transform precoder is to be enabled.

In a fifth aspect, alone or in combination with one or more of the first through fourth aspects, the transmit waveform type is a DFT-s-OFDM waveform or a CP-OFDM waveform.

In a sixth aspect, alone or in combination with one or more of the first through fifth aspects, the new MCS table is a first MCS table associated with a DFT-s-OFDM waveform or a second MCS table associated with a CP-OFDM waveform.

In a seventh aspect, alone or in combination with one or more of the first through sixth aspects, the new MCS table is a first MCS table associated with an enabled transform precoder or a second MCS table associated with a disabled transform precoder.

In an eighth aspect, alone or in combination with one or more of the first through seventh aspects, process 500 includes transmitting a configuration that indicates the initial MCS table, the new MCS table, and an initial transform precoder activation state.

In a ninth aspect, alone or in combination with one or more of the first through eighth aspects, process 500 includes receiving information that indicates that the UE is capable of MCS table switching, such as transmit waveform switching, by dynamic indication.

In a tenth aspect, alone or in combination with one or more of the first through ninth aspects, an activation time for at least one of the new MCS table or the transmit waveform type is based at least in part on a transmission time of acknowledgment feedback for the dynamic indication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
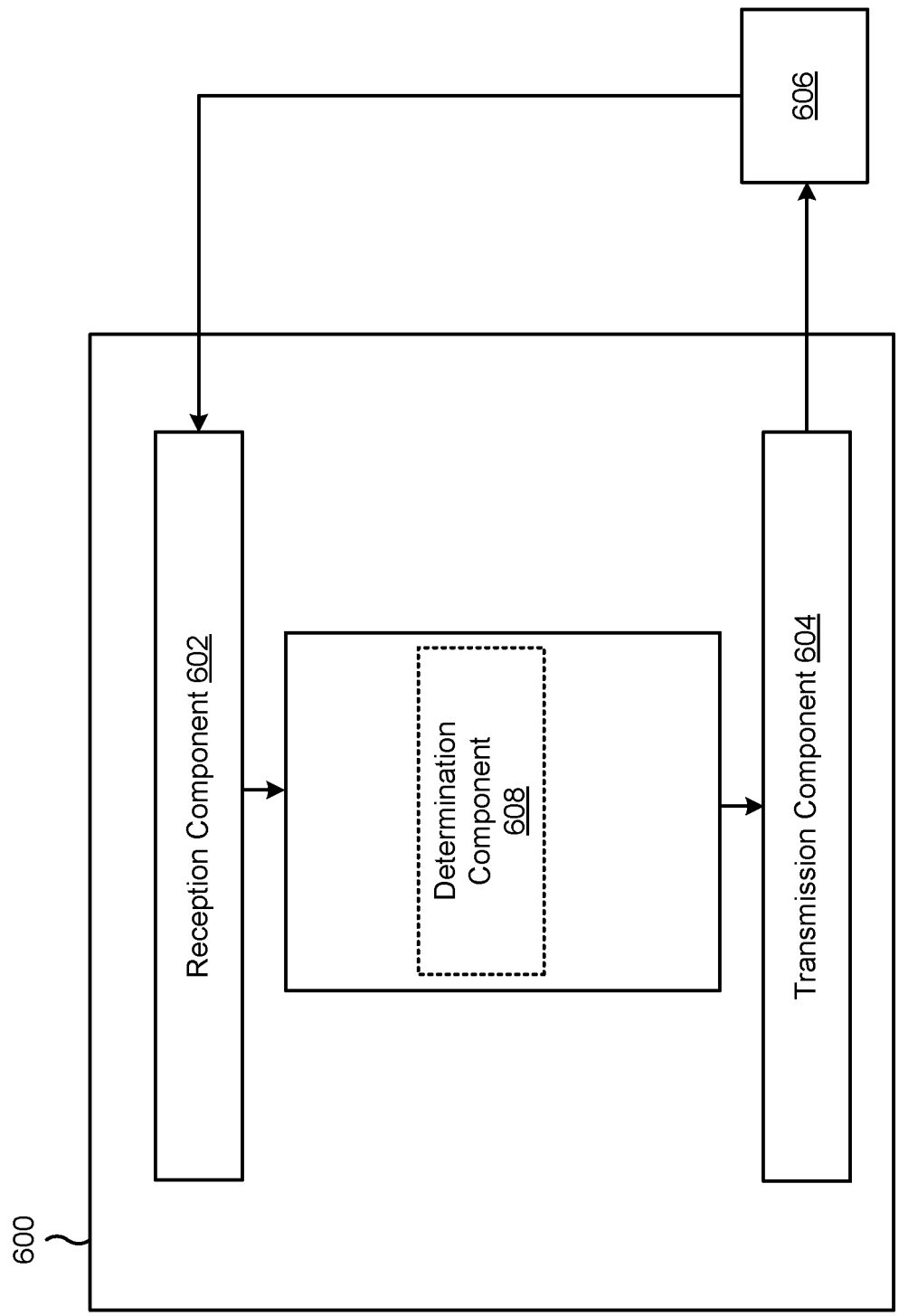
FIGS. 6-7 are diagrams illustrating example apparatuses for wireless communication, in accordance with the present disclosure.

FIG. 6 is a block diagram of an example apparatus 600 for wireless communication, in accordance with the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a determination component 608, among other examples.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4, or a combination thereof. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive, from a base station, a dynamic indication to switch from an initial MCS table to a new MCS table. The transmission component 604 may transmit, to the base station, one or more uplink communications based at least in part on the new MCS table. For example, the transmission component 604 may transmit one or more uplink communications that use a transmit waveform type associated with the new MCS table.

The determination component 608 may determine a transform precoder activation state based at least in part on the new MCS table. The determination component 608 may determine a transmit waveform type for transmitting the one or more uplink communications based at least in part on the new MCS table. In some aspects, the determination component 608 may include a controller/processor, a memory, or a combination thereof, of the UE described above in connection with FIG. 2.

The reception component 602 may receive a configuration that indicates the initial MCS table, the new MCS table, and an initial transform precoder activation state. The transmission component 604 may transmit information that indicates that the UE is capable of MCS table switching, such as transmit waveform switching, by dynamic indication.

The quantity and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
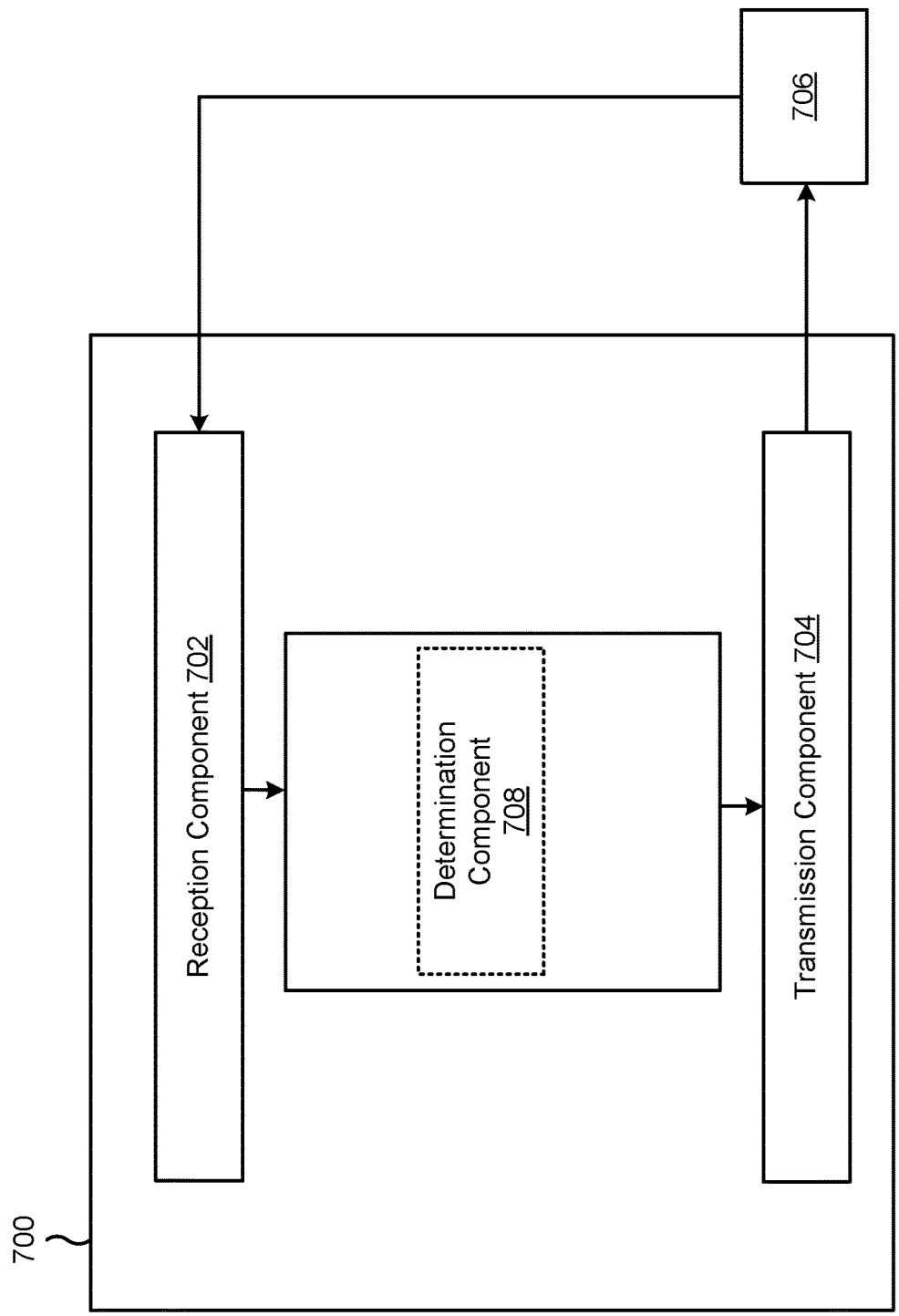

FIG. 7 is a block diagram of an example apparatus 700 for wireless communication, in accordance with the present disclosure. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708, among other examples.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be co-located with the reception component 702 in a transceiver.

The transmission component 704 may transmit, to a UE, a dynamic indication to switch from an initial MCS table to a new MCS table. The reception component 702 may receive, from the UE, one or more uplink communications based at least in part on the new MCS table. For example, the reception component 702 may receive the one or more uplink communications that use a transmit waveform type associated with the new MCS table.

The determination component 708 may determine a transform precoder activation state. The determination component 708 may determine a transmit waveform type for the one or more uplink communications. In some aspects, the determination component 708 may include a controller/processor, a memory, or a combination thereof, of the base station described above in connection with FIG. 2.

The transmission component 704 may transmit a configuration that indicates the initial MCS table, the new MCS table, and an initial transform precoder activation state. The reception component 702 may receive information that indicates that the UE is capable of MCS table switching, such as transmit waveform switching, by dynamic indication.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, from a base station, a dynamic indication to switch from a modulation and coding scheme (MCS) table to a new MCS table; and transmitting, to the base station, one or more uplink communications that use a transmit waveform type associated with the new MCS table.

Aspect 2: The method of Aspect 1, wherein the dynamic indication is received in a medium access control control element (MAC-CE).

Aspect 3: The method of any of Aspects 1-2, further comprising: determining a transform precoder activation state based at least in part on the new MCS table.

Aspect 4: The method of any of Aspects 1-3, further comprising: determining the transmit waveform type for transmitting the one or more uplink communications based at least in part on the new MCS table.

Aspect 5: The method of Aspect 4, wherein determining the transmit waveform type comprises: determining whether a transform precoder is enabled based at least in part on the new MCS table; and determining the transmit waveform type based at least in part on whether the transform precoder is enabled.

Aspect 6: The method of any of Aspects 1-5, wherein the transmit waveform type is a discrete Fourier transform spread orthogonal frequency-division multiplexing waveform or a cyclic prefix orthogonal frequency-division multiplexing waveform.

Aspect 7: The method of any of Aspects 1-6, wherein the new MCS table is a first MCS table associated with a discrete Fourier transform spread orthogonal frequency-division multiplexing waveform or a second MCS table associated with a cyclic prefix orthogonal frequency-division multiplexing waveform.

Aspect 8: The method of any of Aspects 1-7, wherein the new MCS table is a first MCS table associated with an enabled transform precoder or a second MCS table associated with a disabled transform precoder.

Aspect 9: The method of any of Aspects 1-8, further comprising: receiving a configuration that indicates the MCS table, the new MCS table, and an initial transform precoder activation state.

Aspect 10: The method of any of Aspects 1-9, further comprising: transmitting information that indicates that the UE is capable of transmit waveform switching by dynamic indication.

Aspect 11: The method of any of Aspects 1-10, wherein an activation time for at least one of the new MCS table or the transmit waveform type is based at least in part on a transmission time of acknowledgment feedback for the dynamic indication.

Aspect 12: A method of wireless communication performed by a base station, comprising: transmitting, to a user equipment (UE), a dynamic indication to switch from a modulation and coding scheme (MCS) table to a new MCS table; and receiving, from the UE, one or more uplink communications that use a transmit waveform type associated with the new MCS table.

Aspect 13: The method of Aspect 12, wherein the dynamic indication is transmitted in a medium access control control element (MAC-CE).

Aspect 14: The method of any of Aspects 12-13, further comprising: determining a transform precoder activation state for the UE.

Aspect 15: The method of any of Aspects 12-14, further comprising: determining the transmit waveform type for the one or more uplink communications.

Aspect 16: The method of Aspect 15, wherein determining the transmit waveform type comprises: determining whether a transform precoder is to be enabled; and determining the transmit waveform type based at least in part on whether the transform precoder is to be enabled.

Aspect 17: The method of any of Aspects 12-16, wherein the transmit waveform type is a discrete Fourier transform spread orthogonal frequency-division multiplexing waveform or a cyclic prefix orthogonal frequency-division multiplexing waveform.

Aspect 18: The method of any of Aspects 12-17, wherein the new MCS table is a first MCS table associated with a discrete Fourier transform spread orthogonal frequency-division multiplexing waveform or a second MCS table associated with a cyclic prefix orthogonal frequency-division multiplexing waveform.

Aspect 19: The method of any of Aspects 12-18, wherein the new MCS table is a first MCS table associated with an enabled transform precoder or a second MCS table associated with a disabled transform precoder.

Aspect 20: The method of any of Aspects 12-19, further comprising: transmitting a configuration that indicates the MCS table, the new MCS table, and an initial transform precoder activation state.

Aspect 21: The method of any of Aspects 12-20, further comprising: receiving information that indicates that the UE is capable of transmit waveform switching by dynamic indication.

Aspect 22: The method of any of Aspects 12-21, wherein an activation time for at least one of the new MCS table or the transmit waveform type is based at least in part on a transmission time of acknowledgment feedback for the dynamic indication.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        transmit capability information that indicates that the UE is capable of transmit waveform switching by dynamic indication;
        receive, in a medium access control control element (MAC-CE) from a base station, a dynamic indication to switch from a modulation and coding scheme (MCS) table to a new MCS table; and
        transmit, to the base station, one or more uplink communications that use a transmit waveform type associated with the new MCS table, wherein an activation time for at least one of the new MCS table or the transmit waveform type is based at least in part on a transmission time of acknowledgment feedback for the dynamic indication.

2. The UE of claim 1, wherein the one or more processors are further configured to:
    determine a transform precoder activation state based at least in part on the new MCS table.

3. The UE of claim 1, wherein the one or more processors are further configured to:
    determine the transmit waveform type for transmitting the one or more uplink communications based at least in part on the new MCS table.

4. The UE of claim 3, wherein the one or more processors, to determine the transmit waveform type, are configured to:
    determine whether a transform precoder is enabled based at least in part on the new MCS table; and
    determine the transmit waveform type based at least in part on whether the transform precoder is enabled.

5. The UE of claim 1, wherein the transmit waveform type is a discrete Fourier transform spread orthogonal frequency-division multiplexing waveform or a cyclic prefix orthogonal frequency-division multiplexing waveform.

6. The UE of claim 1, wherein the new MCS table is a first MCS table associated with a discrete Fourier transform spread orthogonal frequency-division multiplexing waveform or a second MCS table associated with a cyclic prefix orthogonal frequency-division multiplexing waveform.

7. The UE of claim 1, wherein the new MCS table is a first MCS table associated with an enabled transform precoder or a second MCS table associated with a disabled transform precoder.

8. The UE of claim 1, wherein the one or more processors are further configured to:
    receive a configuration that indicates the MCS table, the new MCS table, and an initial transform precoder activation state.

9. A base station for wireless communication, comprising:
    a memory; and
    one or more processors, coupled to the memory, configured to:
        receive capability information that indicates that a user equipment (UE) is capable of transmit waveform switching by dynamic indication;
        transmit, to the UE in a medium access control control element (MAC-CE), a dynamic indication to switch from a modulation and coding scheme (MCS) table to a new MCS table; and
        receive, from the UE, one or more uplink communications that use a transmit waveform type associated with the new MCS table, wherein an activation time for at least one of the new MCS table or the transmit waveform type is based at least in part on a transmission time of acknowledgment feedback for the dynamic indication.

10. The base station of claim 9, wherein the one or more processors are further configured to:
    determine a transform precoder activation state for the UE.

11. The base station of claim 9, wherein the one or more processors are further configured to:
    determine the transmit waveform type for the one or more uplink communications.

12. The base station of claim 11, wherein the one or more processors, to determine the transmit waveform type, are configured to:
    determine whether a transform precoder is to be enabled; and
    determine the transmit waveform type based at least in part on whether the transform precoder is to be enabled.

13. The base station of claim 9, wherein the transmit waveform type is a discrete Fourier transform spread orthogonal frequency-division multiplexing waveform or a cyclic prefix orthogonal frequency-division multiplexing waveform.

14. The base station of claim 9, wherein the new MCS table is a first MCS table associated with a discrete Fourier transform spread orthogonal frequency-division multiplexing waveform or a second MCS table associated with a cyclic prefix orthogonal frequency-division multiplexing waveform.

15. The base station of claim 9, wherein the new MCS table is a first MCS table associated with an enabled transform precoder or a second MCS table associated with a disabled transform precoder.

16. The base station of claim 9, wherein the one or more processors are further configured to:
    transmit a configuration that indicates the MCS table, the new MCS table, and an initial transform precoder activation state.

17. A method of wireless communication performed by a user equipment (UE), comprising:
    transmitting capability information that indicates that the UE is capable of transmit waveform switching by dynamic indication;

receiving, in a medium access control control element (MAC-CE) from a base station, a dynamic indication to switch from a modulation and coding scheme (MCS) table to a new MCS table; and transmitting, to the base station, one or more uplink communications that use a transmit waveform type associated with the new MCS table, wherein an activation time for at least one of the new MCS table or the transmit waveform type is based at least in part on a transmission time of acknowledgment feedback for the dynamic indication.

18. The method of claim 17, further comprising:
determining the transmit waveform type for transmitting the one or more uplink communications based at least in part on the new MCS table.

19. The method of claim 18, wherein determining the transmit waveform type comprises:
determining whether a transform precoder is enabled based at least in part on the new MCS table; and
determining the transmit waveform type based at least in part on whether the transform precoder is enabled.

20. The method of claim 17, further comprising:
determining a transform precoder activation state based at least in part on the new MCS table.

21. The method of claim 17, wherein the transmit waveform type is a discrete Fourier transform spread orthogonal frequency-division multiplexing waveform or a cyclic prefix orthogonal frequency-division multiplexing waveform.

22. The method of claim 17, wherein the new MCS table is a first MCS table associated with a discrete Fourier transform spread orthogonal frequency-division multiplexing waveform or a second MCS table associated with a cyclic prefix orthogonal frequency-division multiplexing waveform.

23. The method of claim 17, wherein the new MCS table is a first MCS table associated with an enabled transform precoder or a second MCS table associated with a disabled transform precoder.

24. The method of claim 17, further comprising:
receiving a configuration that indicates the MCS table, the new MCS table, and an initial transform precoder activation state.

25. A method of wireless communication performed by a base station, comprising:
transmitting, to a user equipment (UE) in a medium access control control element (MAC-CE), a dynamic indication to switch from a modulation and coding scheme (MCS) table to a new MCS table; and
receiving, from the UE, one or more uplink communications that use a transmit waveform type associated with the new MCS table, wherein an activation time for at least one of the new MCS table or the transmit waveform type is based at least in part on a transmission time of acknowledgment feedback for the dynamic indication.

26. The method of claim 25, further comprising:
determining the transmit waveform type for the one or more uplink communications.

27. The method of claim 26, wherein determining the transmit waveform type comprises:
determining whether a transform precoder is to be enabled; and
determining the transmit waveform type based at least in part on whether the transform precoder is to be enabled.

28. The method of claim 25, further comprising:
determining a transform precoder activation state for the UE.

29. The method of claim 25, wherein the transmit waveform type is a discrete Fourier transform spread orthogonal frequency-division multiplexing waveform or a cyclic prefix orthogonal frequency-division multiplexing waveform.

30. The method of claim 25, wherein the new MCS table is a first MCS table associated with a discrete Fourier transform spread orthogonal frequency-division multiplexing waveform or a second MCS table associated with a cyclic prefix orthogonal frequency-division multiplexing waveform.

* * * * *